United States Patent
Sun et al.

(10) Patent No.: US 12,064,882 B2
(45) Date of Patent: Aug. 20, 2024

(54) METHOD FOR DIAGNOSING A ROBOT, DEVICE AND SERVER

(71) Applicant: ABB Schweiz AG, Baden (CH)

(72) Inventors: Heqing Sun, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 465 days.

(21) Appl. No.: 17/296,756

(22) PCT Filed: Dec. 24, 2018

(86) PCT No.: PCT/CN2018/123237
§ 371 (c)(1),
(2) Date: May 25, 2021

(87) PCT Pub. No.: WO2020/132837
PCT Pub. Date: Jul. 2, 2020

(65) Prior Publication Data
US 2022/0024038 A1    Jan. 27, 2022

(51) Int. Cl.
*B25J 9/16*    (2006.01)
(52) U.S. Cl.
CPC ... *B25J 9/1674* (2013.01); *G05B 2219/39412* (2013.01)
(58) Field of Classification Search
CPC .... B25J 9/1674; G01M 13/04; G01M 13/045; G05B 2219/39412
See application file for complete search history.

(56) References Cited

U.S. PATENT DOCUMENTS

| | | |
|---|---|---|
| 8,121,729 B2 | 2/2012 | Blanc et al. |
| 9,205,560 B1 * | 12/2015 | Edsinger ............... B25J 9/1674 |
| 2010/0161255 A1 * | 6/2010 | Mian .................. G01N 29/4463 |
| | | 702/56 |

(Continued)

FOREIGN PATENT DOCUMENTS

| | | |
|---|---|---|
| CN | 1342281 A | 3/2002 |
| CN | 101114171 A | 1/2008 |

(Continued)

OTHER PUBLICATIONS

European Patent Office, Partial Supplementary European Search Report in European Patent Application No. 18944362.5, 12 pp. (Jul. 8, 2022).

(Continued)

*Primary Examiner* — Manuel L Barbee
(74) *Attorney, Agent, or Firm* — Leydig, Voit & Mayer, Ltd.

(57) ABSTRACT

Methods and devices for diagnosing a robot. The method includes obtaining a first signal generated by a rotating component of the robot during operation of the robot. The first signal includes motion information of the rotating component. The first signal is preprocessed to filter out a part of the motion information in the first signal. The preprocessed first signal or spectrum information about the preprocessed first signal is sent to a server for diagnosing the robotU. A second signal is received from the server, wherein the second signal includes diagnostic information indicating whether a sub-component of the rotating component has a failure.

28 Claims, 6 Drawing Sheets

(56) References Cited

U.S. PATENT DOCUMENTS

| | | | | |
|---|---|---|---|---|
| 2014/0201571 A1* | 7/2014 | Hosek | .................... | B25J 9/1674 |
| | | | | 714/26 |
| 2015/0160101 A1* | 6/2015 | Gao | .................... | G01M 13/028 |
| | | | | 702/6 |
| 2017/0241422 A1* | 8/2017 | Munk | .................... | F04D 29/669 |
| 2018/0169864 A1 | 6/2018 | Haddadin | | |
| 2018/0335366 A1* | 11/2018 | Qiao | .................... | G01M 13/045 |

FOREIGN PATENT DOCUMENTS

| | | |
|---|---|---|
| CN | 105095918 A | 11/2015 |
| CN | 105415374 A | 3/2016 |
| CN | 106599794 A | 4/2017 |
| CN | 108058188 A | 5/2018 |
| JP | 8-190412 A | 7/1996 |
| WO | WO 2012/099342 A2 | 7/2012 |

OTHER PUBLICATIONS

European Patent Office, Extended European Search Report in European Patent Application No. 18944362.5, 14 pp. (Sep. 20, 2022).

Chinese National Intellectual Property Administration, International Search Report in International Patent Application No. PCT/CN2018/123237, 5 pp. (Apr. 1, 2019).

Chinese National Intellectual Property Administration, Written Opinion in International Patent Application No. PCT/CN2018/123237, 4 pp. (Apr. 1, 2019).

\* cited by examiner

METHOD FOR DIAGNOSING A ROBOT, DEVICE AND SERVER

CROSS-REFERENCE TO RELATED APPLICATIONS

This patent application is a U.S. national phase patent application of International Patent Application No. PCT/CN2018/123237, filed Dec. 24, 2018, which is fully incorporated herein by reference for all purposes.

TECHNICAL FIELD

Example embodiments of the present disclosure generally relate to robot diagnosis and more particularly, to a method for diagnosing a robot, device and server.

BACKGROUND

Robots play important parts in modern industries since they are able to work faster, more precise and run longer than us human beings. With more robots operating automatically, it is more and more important to discover faults that may cause losses in performances or even plant downtime as early as possible in order to minimize impact on the users' operation.

The main solutions in the prior art focus on robot abnormality detection on system level to diagnose a local robot. However, these solutions identify the failure source only based on the historical data of the local robot, which makes the diagnosis result inaccurate and thus unconvincing.

In addition, other solutions in the prior art provide remote monitoring through sending the raw data of local robots to a remote server. However, some users are reluctant to share their robot data, which could be part of their business secret.

SUMMARY

Example embodiments of the present disclosure propose a solution for diagnosing a robot.

In a first aspect, example embodiments of the present disclosure provide a method for diagnosing a robot. The method comprises: obtaining a first signal generated by a rotating component of the robot during operation of the robot, the first signal at least comprising motion information of the rotating component; preprocessing the first signal to filter out a part of the motion information in the first signal; sending the preprocessed first signal or spectrum information about the preprocessed first signal to a server for diagnosing the robot; and receiving a second signal from the server, the second signal comprising diagnostic information indicating whether a sub-component of the rotating component has a failure.

In some embodiments, preprocessing the first signal comprises: segmenting the first signal in a time domain into a plurality of parts; and selecting at least one of the plurality of parts to send to the server.

In some embodiments, preprocessing the first signal comprises: resampling the first signal with a sampling rate based on a speed of the rotating component; segmenting the resampled first signal into a plurality of parts; and selecting at least one of the plurality of parts to send to the server.

In some embodiments, preprocessing the first signal comprises: determining a spectrum of the first signal; segmenting the spectrum into a plurality of parts; and selecting at least one of the plurality of parts to send to the server.

In some embodiments, preprocessing the first signal comprises: determining a spectrum of the first signal; and determining the spectrum information from the spectrum, the spectrum information at least comprising a frequency amplitude of a sub-component of the rotating component based on a physical characteristics and a speed of the sub-component.

In some embodiments, the motion information indicates at least one of the following: a rotational speed of the rotating component; a control current of the rotating component; a torque of the rotating component; and an acceleration of the rotating component.

In some embodiments, the sub-component comprises at least one of following part: a gear of a gearbox; a shaft of a motor; and a bearing of the motor or gearbox.

In a second aspect, example embodiments of the present disclosure provide a method for diagnosing a robot. The method comprises: receiving a first signal or spectrum information about the first signal from a robot, the first signal at least comprising motion information of a rotating component; obtaining a frequency amplitude of a sub-component of the rotating component based on the received first signal or the received spectrum information; detecting a failure of the sub-component by comparing the frequency amplitude with a threshold amplitude; and sending a second signal to the robot, the second signal comprising diagnostic information indicating whether the sub-component of the rotating component has a failure.

In some embodiments, detecting the failure comprises: in response to the frequency amplitude exceeding the threshold amplitude, detecting that the sub-component has the failure.

In some embodiments, obtaining the frequency amplitude comprises: resampling the received first signal with a sampling rate based on a speed of the rotating component; and determining the frequency amplitude from a spectrum of the resampled first signal based on a physical characteristics and a speed of the sub-component.

In some embodiments, obtaining the frequency amplitude comprises: determining the frequency amplitude from the received spectrum information based on a physical characteristics and a speed of the sub-component.

In some embodiments, the physical characteristic comprises one or more structural parameters and/or one or more dimensional parameters of the sub-component.

In some embodiments, the threshold amplitude is empirically predetermined.

In some embodiments, the threshold amplitude is determined by machine self-learning.

In a third aspect, example embodiments of the present disclosure provide a device. The device comprises: a controller and a memory coupled to the controller and storing machine-executable instructions which, when executed by the controller, cause the robot to perform acts comprising: obtaining a first signal generated by a rotating component of the robot during operation of the robot, the first signal comprising motion information of the rotating component; preprocessing the first signal to filter out a part of the motion information in the first signal; sending the preprocessed first signal or spectrum information about the preprocessed first signal to a server for diagnosing the robot; and receiving a second signal from the server, the second signal comprising diagnostic information which indicates a failure of a sub-component of the rotating component.

In a fourth aspect, example embodiments of the present disclosure provide a server. The server comprises: a controller and a memory coupled to the controller and storing machine-executable instructions which, when executed by the controller, cause the server to perform acts comprising: receiving a first signal or spectrum information about the first signal from a robot, the first signal at least comprising motion information of a rotating component; obtaining a frequency amplitude of a sub-component of the rotating component based on the received first signal or the received spectrum information; detecting a failure of the sub-component by comparing the frequency amplitude with a threshold amplitude; and sending a second signal to the robot, the second signal comprising diagnostic information indicating whether the sub-component of the rotating component has a failure.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
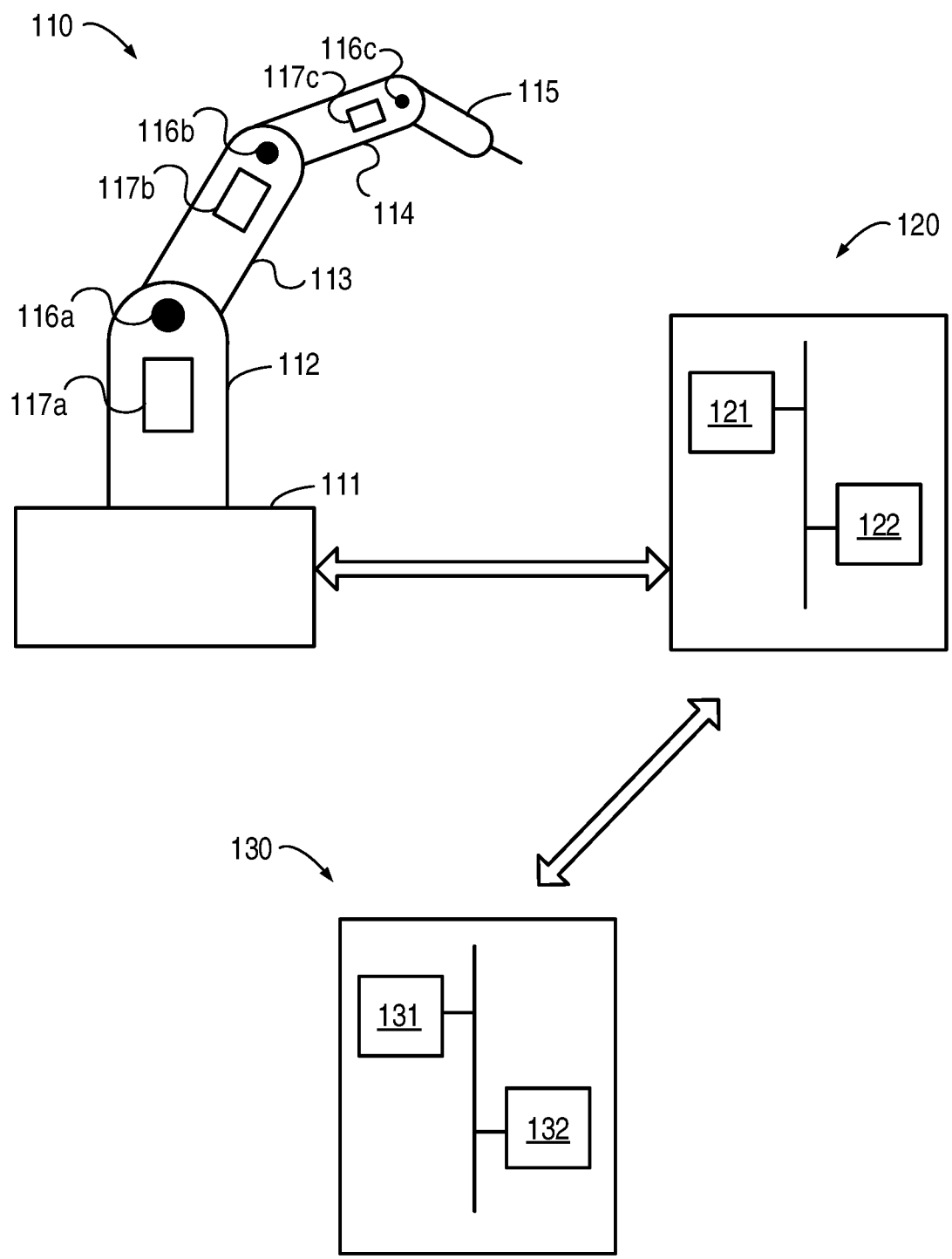
FIG. 1 shows a block diagram illustrating a system for diagnosing the robot in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

FIG. 1 shows a block diagram illustrating a system 100 for diagnosing the robot in accordance with some example embodiments of the present disclosure. The system comprises a industrial robot 110, a local device 120 and a remote server 130. The robot 110 comprises a base 111, three arms 112, 113, 114 and a tool holder 115. The arms 113, 114 and the tool holder 115 are rotatable about a plurality of joints 116a-116c. The industrial robot also comprises a plurality of actuator 117a-117c for driving the movements of the arms 112, 113, 114. Each actuator 117a-117c comprises a motor including a motor shaft and a transmission unit configured to transfer rotational movements of the motor shaft to the joints. Each transmission unit comprises a gear and a gear shaft.

The industrial robot 110 is connected to a local device 120 for executing robot program, which comprises a controller 121 and a memory 122. The memory 122 is coupled to the controller 121 and storing machine-executable instructions. The device 120 may be configured to transmit a control signal to the industrial robot 110 to control the operation of the actuator 117a-117c of the industrial robot 110, such as the rotation of the motor in the actuator 117a-117c. At the same time, the device 120 can also be configured to receive feedback signals from the industrial robot 110 to monitor and diagnose the operation state of the industrial robot 110.

The local device 120 is communicated with the remote server 130, which also comprises a controller 131 and a memory 132. The memory 132 is coupled to the controller 131 and storing machine-executable instructions. The server 130 may comprise storage for stored the received data from local devices.

Figure 2:
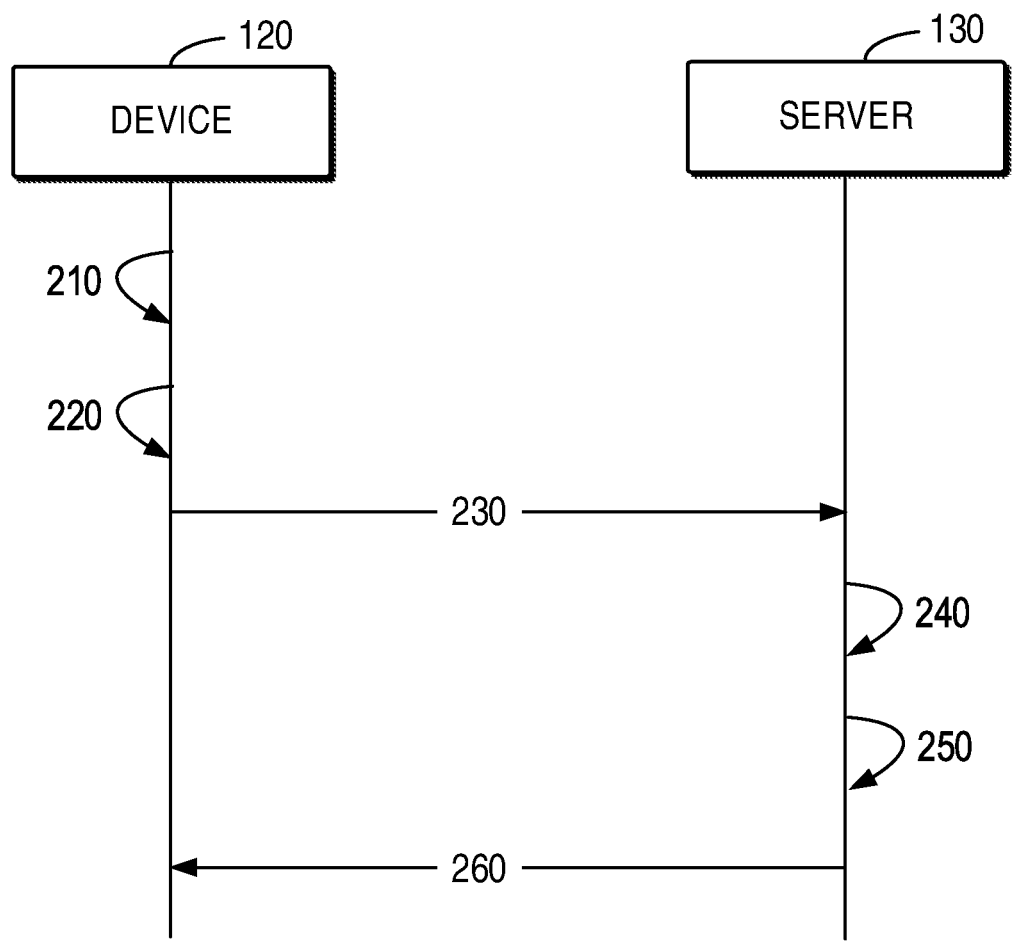
FIG. 2 shows a swim lane chart illustrating a process for diagnosing the robot in accordance with some example embodiments of the present disclosure.

FIG. 2 shows a swim lane chart illustrating a process 200 for diagnosing the robot in accordance with some example embodiments of the present disclosure. For the purpose of discussion, the process 200 will be described with reference to FIG. 1. The process 200 may involve the local device 120 and the remote server 130 as illustrated in FIG. 1.

At 210, the device 120 obtains a first signal. The first signal is generated by a rotating component of the robot 110 during operation of the robot 110, the first signal at least comprising motion information of the rotating component. The rotating component may be the actuator 117a-117c of the robot 110. The motion information may indicate a rotational speed of the rotating component, a control current of the rotating component, a torque of the rotating component, or an acceleration of the rotating component.

The first signal may be the signal of specific joint in a time interval during which the actuator 117a-117c is rotates. The first signal may be voltage or current measured by the sensors within the robot 110 and transmitted through the cable between the robot 110 and the device 120. The first signal could also be measured by external sensors installed on the robot, such as accelerometer.

At 220, the first signal is preprocessed by the device 120 to filter out a part of the motion information in the first signal. In this manner, the users can preprocess the raw data before uploading to the server 130, so as to mask or delete part of the raw data to protect the user's trade and technical secrets.

In some embodiments, preprocessing the first signal may comprise: segmenting the first signal in a time domain into a plurality of parts; and selecting at least one of the plurality of parts to send to the server. In this way, the preprocessing can be implemented in the time domain.

In some embodiments, preprocessing the first signal may comprise: resampling the first signal with a sampling rate based on a speed of the rotating component; segmenting the resampled first signal into a plurality of parts; and selecting at least one of the plurality of parts to send to the server. In this way, the impact of varying speed (which happens during acceleration and deceleration) can be removed, thereby improving the reliability and accuracy of spectrum analysis.

In some embodiments, preprocessing the first signal may comprise: determining a spectrum of the first signal; segmenting the spectrum into a plurality of parts; and selecting at least one of the plurality of parts to send to the server. In this way, the preprocessing can be implemented in the frequency domain.

Through extracting parts of the first signal, whether in the time domain or the frequency domain, the waveform of the first signal cannot be reproduced based on the parts uploaded to the server. In other words, some of the motion information of the robot can be masked.

In some embodiments, preprocessing the first signal may comprise: determining a spectrum of the first signal; and determining the spectrum information from the spectrum, wherein the spectrum information at least comprises a frequency amplitude of a sub-component of the rotating component based on a physical characteristics and a speed of the sub-component.

Through this manner, it is possible to transmit only the spectrum information required for the failure diagnosis, thereby reducing the amount of data transfer and protecting the user information. In particular, the local device 120 needs only transfer the value of frequency amplitude to the server 130, which further reducing the amount of data transfer and protecting the user information.

At 230, the local device 120 sends the preprocessed first signal to the remote server 130.

At 240, the remote server 130 obtains a frequency amplitude of a sub-component of the rotating component based on the received first signal or the received spectrum information.

In some embodiments, obtaining the frequency amplitude may comprise: resampling the received first signal with a sampling rate based on a speed of the rotating component; and determining the frequency amplitude from a spectrum of the resampled first signal based on a physical characteristics and a speed of the sub-component.

The sampling rate may be determined based on the speed of the rotating component. For example, the sampling rate is proportional to the speed of the rotating component, so that more sample values are obtained when the speed is high. In this way, the impact of varying speed (which happens during acceleration and deceleration) can be removed, thereby improving the reliability and accuracy of spectrum analysis. The spectrum may be determined through Fourier transformation.

In this manner, it is possible to directly use the motion signal obtained during normal operation of the robot for failure diagnosis, rather than the motion signal from a specific operation mode, thereby avoiding the interruption of industrial production.

It should be understood that the above-described methods of obtaining the spectrum are merely exemplary and are not intended to limit the scope of the disclosure. For example, when the rotating component does not vary its speed, the obtained motion signal can be directly converted from the time domain into the frequency domain without resampling.

In some embodiments, obtaining the frequency amplitude comprises: determining the frequency amplitude from the received spectrum information based on a physical characteristics and a speed of the sub-component.

The rotating component may comprise a plurality of sub-components, which may be a gear or a bearing inside the gearbox, a shaft or a bearing of the motor, or other structural components in the actuator 117a-117c. The physical characteristic comprises one or more structural parameters and/or one or more dimensional parameters of the sub-component.

Based on the physics analysis, each sub-component of the rotating component has a characteristic frequency, which is dependent on the sub-component structural parameter and/or dimensional parameter, like gear tooth number, bearing ball number, and bearing inner/outer raceway diameter.

The characteristic frequency is further dependent on the rotation speed of the sub-component. For example, the characteristic frequency of a gear may be $k*\omega$, where $\omega$ is the rotation speed and $k$ is the structural/dimensional parameter of the gear.

Such parameters of the sub-components can be predetermined and stored in the device 120. The rotation speed of the sub-components can be directly measured by sensors or indirectly calculated through other measured data such as the angular position of the motor. Such measurement is usually included in the robot for normal operation, thereby no additional cost is increased.

Through the characteristic frequency of the sub-component, the frequency amplitude corresponding to the sub-component can be determined from the spectrum.

At 250, the server 130 detects a failure of the sub-component by comparing the frequency amplitude with a threshold amplitude.

By failure analysis of the robot 110, the frequency amplitude of each sub-component can be considered as an indicator, which indicates whether a sub-component of the rotating component in the robot 110 has a failure.

In this manner, it is possible to detect a failure on sub-assembly level in the robot, thereby more accurately determining the failure source. As a result, the user can be prompted earlier than before to perform appropriate repairs and replacements, which can extend the life of the robot.

In some embodiments, the threshold amplitude is empirically predetermined.

In some embodiments, the threshold amplitude is determined by machine self-learning.

Due to fact that the server 130 may collect a large amount of data, and the data have been identified or marked as "good" (for no failure) or "bad" (for failure), a self-learning method such as neural network could be applied to learn the optimal threshold amplitudes for different working condition, like speed and payload.

In some embodiments, detecting the failure may comprise: in response to the frequency amplitude exceeding the threshold amplitude, detecting that the sub-component has the failure.

At 260, the remote server 130 sends a second signal to the local device 120. The second signal comprises diagnostic information indicating whether the sub-component of the rotating component has a failure.

After receiving the second signal from the server 130, the local device may display the diagnostic results to the user, for example, via a graphical user interface, allowing the user to visually identify the failure source and take appropriate action.

Figure 3:
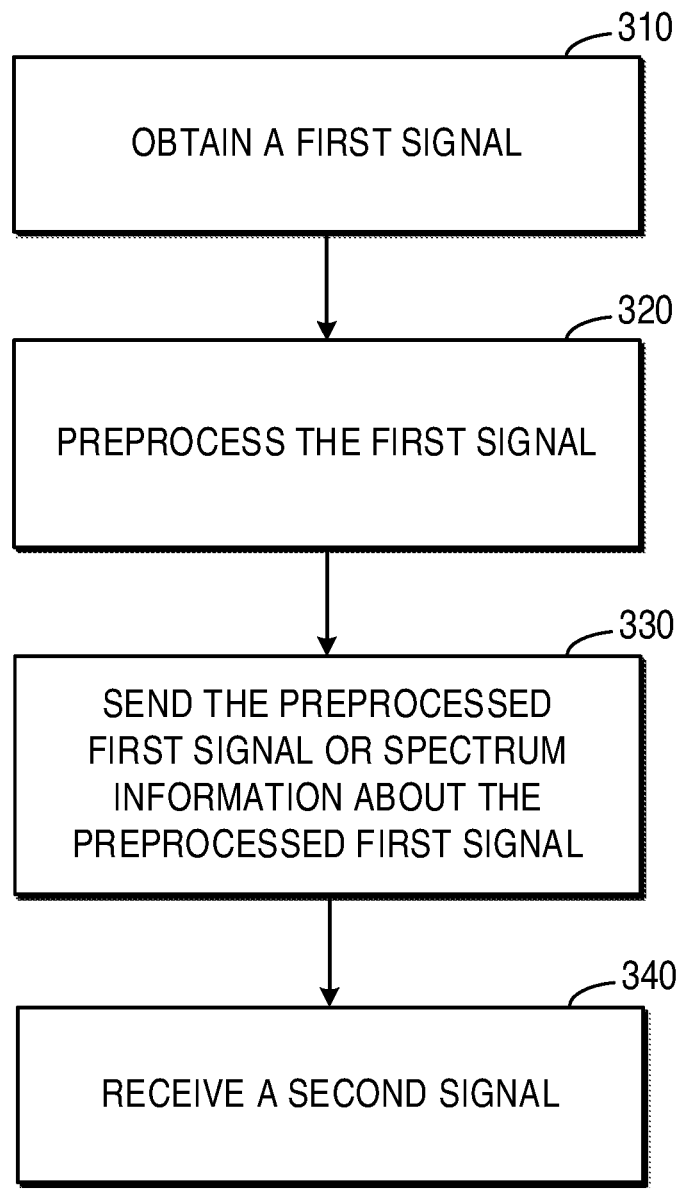
FIG. 3 illustrates flowchart of a method for diagnosing a robot implemented at a local device in accordance with some example embodiments of the present disclosure.

FIG. 3 illustrates flowchart of a method for diagnosing a robot implemented at a local device in accordance with some example embodiments of the present disclosure.

At 310, a first signal is obtained which is generated by a rotating component of the robot during operation of the robot. The first signal at least comprises motion information of the rotating component.

At 320, the first signal is preprocessed to filter out a part of the motion information in the first signal.

At 330, the preprocessed first signal or spectrum information about the preprocessed first signal is sent to a server for diagnosing the robot.

At 340, a second signal is received from the server. The second signal comprises diagnostic information indicating whether a sub-component of the rotating component has a failure.

Figure 4:
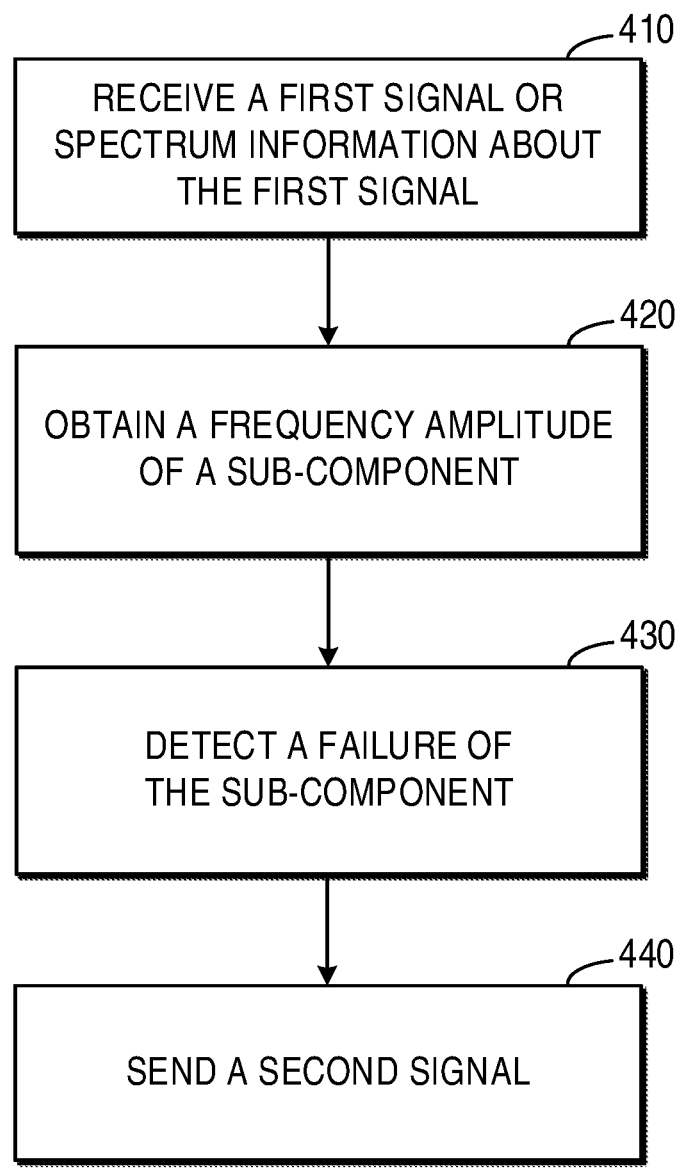
FIG. 4 illustrates flowchart of a method for diagnosing a robot implemented at a remote server in accordance with some example embodiments of the present disclosure.

FIG. 4 illustrates flowchart of a method for diagnosing a robot implemented at a remote server in accordance with some example embodiments of the present disclosure.

At 410, a first signal or spectrum information about the first signal is received from a robot. The first signal at least comprises motion information of a rotating component.

At 420, a frequency amplitude of a sub-component of the rotating component is obtained based on the received first signal or the received spectrum information.

At 430, a failure of the sub-component is detected by comparing the frequency amplitude with a threshold amplitude.

At 440, a second signal is sent to the robot. The second signal comprises diagnostic information indicating whether the sub-component of the rotating component has a failure.

Figure 5:
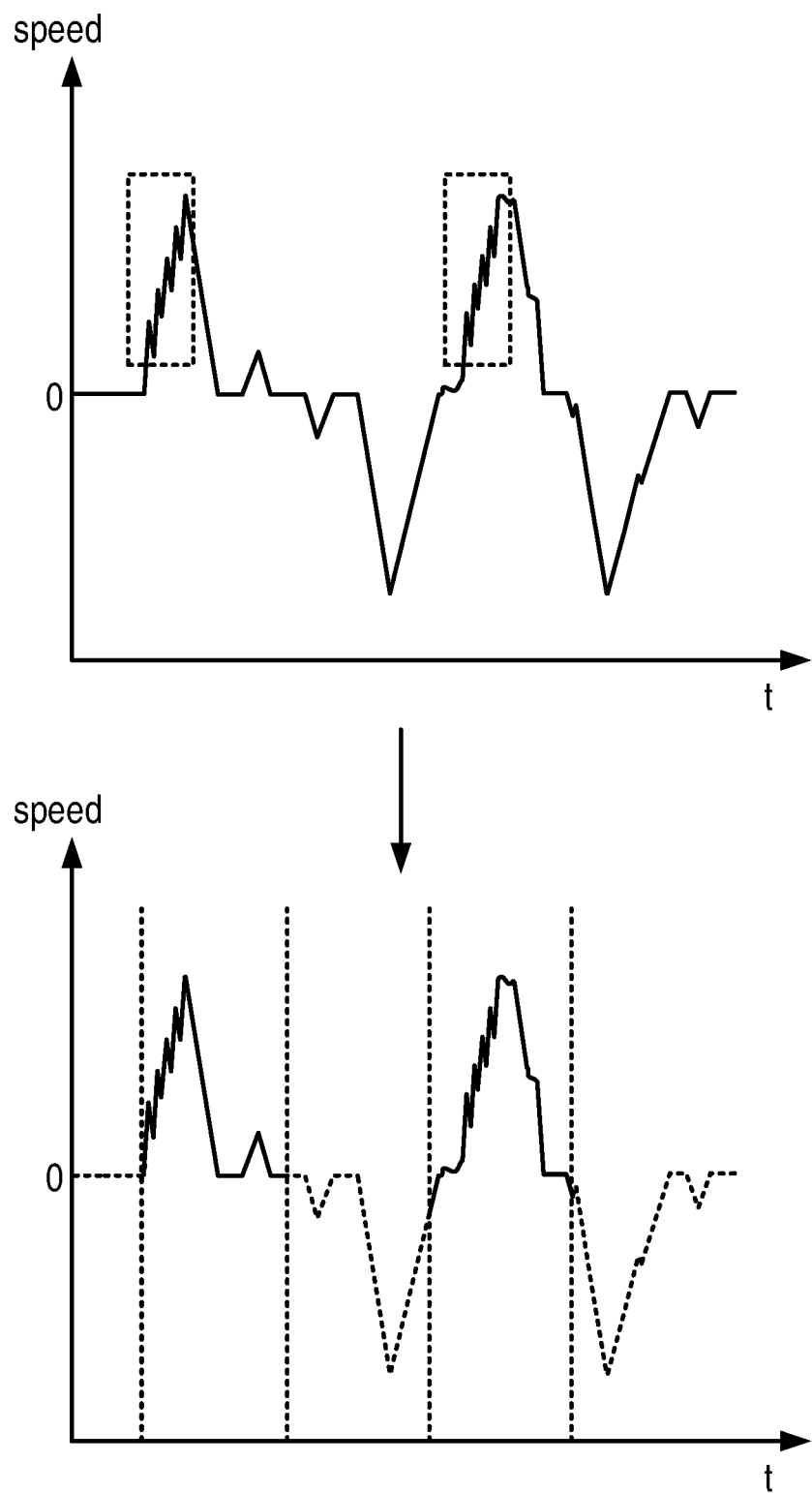
FIG. 5 illustrates a diagram showing a waveform of motion signal before and after preprocessing in accordance with some example embodiments of the present disclosure.

FIG. 5 illustrates a diagram showing a waveform of motion signal before and after preprocessing in accordance with some example embodiments of the present disclosure.

It can be seen that the waveform of the motion signal in the FIG. 5 is not strictly periodic, but has some fluctuations, for example referring to the part in the dotted box. Sources of these fluctuations may be, for example, a change in load or a potential failure of components. Therefore, a diagnostic analysis is needed to determine the cause of the fluctuations.

In order to protect the user's trade and technical secrets, the waveform of the motion signal as shown in FIG. 5 is segmented, and only the parts marked with solid lines are uploaded to the server.

Figure 6:
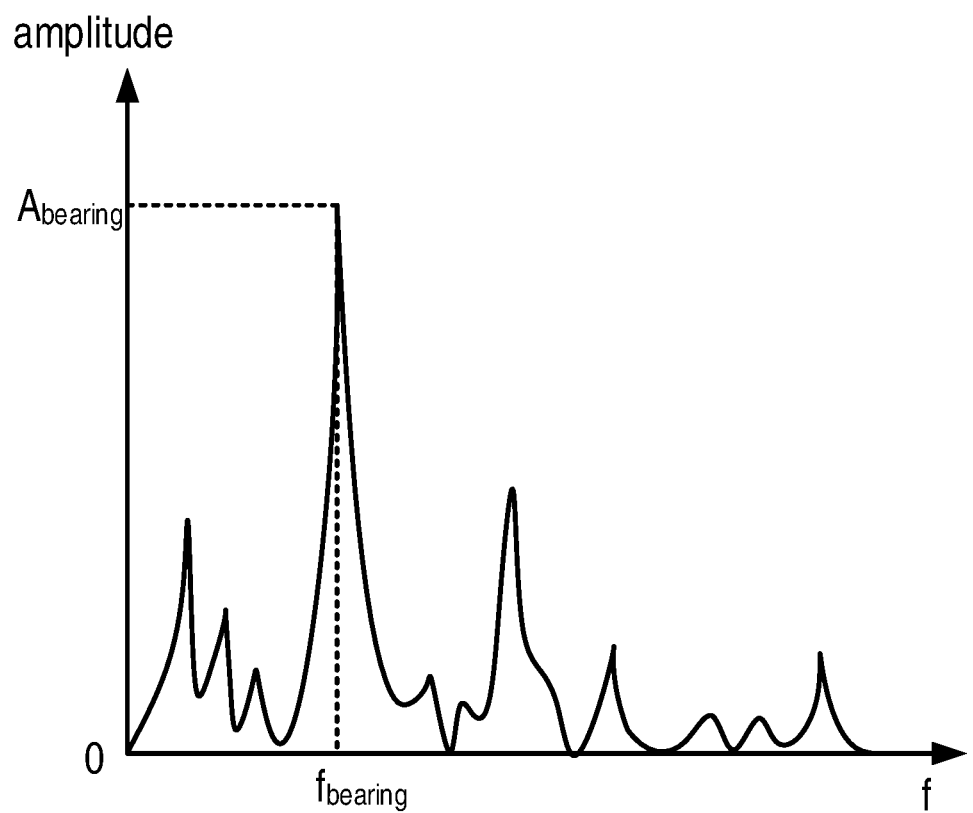
FIG. 6 illustrates a diagram showing a spectrum of motion signal in accordance with some example embodiments of the present disclosure.

FIG. 6 illustrates a diagram showing a spectrum of motion signal in accordance with some example embodiments of the present disclosure. It can be seen that the frequency amplitudes corresponding to some frequencies in the FIG. 6 are significantly higher than the frequency amplitudes corresponding to other frequencies. Since each sub-component has an individual characteristic frequency, the diagnosis can be performed by comparing the frequency amplitude value corresponding to the characteristic frequency with a preset threshold amplitude value.

For example, FIG. 6 shows the characteristic frequency $f_{bearing}$ of motor bearing, which is depend on the structural or dimensional parameters of the bearing, such as ball number, diameter of the bearing raceway, and the rotating speed of the bearing. Through the spectrum illustrated in FIG. 6, the frequency amplitude $A_{bearing}$ corresponding to the characteristic frequency $f_{bearing}$ can be determined. Such frequency amplitude $A_{bearing}$ can be used as an indicator of whether the motor bearing has a failure, such as cracks or pitting on the bearing ball or raceway. If the frequency amplitude $A_{bearing}$ exceeds the threshold amplitude of the motor bearing, then it can be determined that the bearing has a failure.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3 and FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for diagnosing a robot, comprising:
    obtaining a first signal generated by a rotating component of the robot during operation of the robot, the first signal at least comprising motion information of the rotating component;
    preprocessing the first signal to filter out a part of the motion information in the first signal, wherein preprocessing the first signal comprises determining a spectrum of the first signal;
    sending the preprocessed first signal and spectrum information about the preprocessed first signal to a server for diagnosing the robot, wherein the spectrum information comprises a frequency amplitude of a sub-component of the rotating component, wherein the frequency amplitude is determined from the spectrum of a resampled first signal based on physical characteristics of the sub-component and a speed of the sub-component, wherein the physical characteristics comprise one or more dimensional parameters of the sub-component; and
    receiving a second signal from the server, the second signal comprising diagnostic information indicating whether a sub-component of the rotating component has a failure.

2. The method of claim 1, wherein preprocessing the first signal comprises:
    segmenting the first signal in a time domain into a plurality of parts; and
    selecting at least one of the plurality of parts to send to the server.

3. The method of claim 1, wherein preprocessing the first signal comprises:
    resampling the first signal with a sampling rate based on a speed of the rotating component;
    segmenting the resampled first signal into a plurality of parts; and
    selecting at least one of the plurality of parts to send to the server.

4. The method of claim 1, wherein preprocessing the first signal comprises:
    segmenting the spectrum into a plurality of parts; and
    selecting at least one of the plurality of parts to send to the server.

5. The method of claim 1, wherein preprocessing the first signal comprises:
    determining the spectrum information from the spectrum, the spectrum information at least comprising the frequency amplitude of the sub-component of the rotating component based on the physical characteristics of the sub-component and the speed of the sub-component.

6. The method of claim 1, wherein the motion information indicates at least one of the following:
    a rotational speed of the rotating component;
    a control current of the rotating component;
    a torque of the rotating component; and
    an acceleration of the rotating component.

7. The method of claim 1, wherein the sub-component comprises at least one of the following:
    a gear of a gearbox;
    a shaft of a motor; or
    a bearing of a motor or a gearbox.

8. A method for diagnosing robot, comprising:
    receiving a first signal or spectrum information about the first signal from a robot, the first signal at least comprising motion information of a rotating component;
    obtaining a frequency amplitude of a sub-component of the rotating component based on the received first signal or the received spectrum information, wherein the frequency amplitude is determined from a spectrum of a resampled first signal based on physical characteristics of the sub-component, wherein the physical characteristics comprise one or more dimensional parameters of the sub-component;
    detecting a failure of the sub-component by comparing the frequency amplitude with a threshold amplitude; and
    sending a second signal to the robot, the second signal comprising diagnostic information indicating whether the sub-component of the rotating component has a failure.

9. The method of claim 8, wherein detecting the failure comprises:
    in response to the frequency amplitude exceeding the threshold amplitude, detecting that the sub-component has the failure.

10. The method of claim 8, wherein obtaining the frequency amplitude comprises:
    resampling the received first signal with a sampling rate based on a speed of the rotating component; and
    determining the frequency amplitude from the spectrum of the resampled first signal based on the physical characteristics of the sub-component and a speed of the sub-component.

11. The method of claim 10, wherein the physical characteristic comprises one or more structural parameters of the sub-component.

12. The method of claim 8, wherein obtaining the frequency amplitude comprises:
    determining the frequency amplitude from the received spectrum information based on the physical characteristics of the sub-component and a speed of the sub-component.

13. The method of claim 8, wherein the threshold amplitude is empirically predetermined.

14. The method of claim 8, wherein the threshold amplitude is determined by machine self-learning.

15. A device, comprising:
    a controller;

a memory coupled to the controller and storing machine-executable instructions which, when executed by the controller, cause the robot to perform acts comprising:
obtaining a first signal generated by a rotating component of the robot during operation of the robot, the first signal comprising motion information of the rotating component;
preprocessing the first signal to filter out a part of the motion information in the first signal, wherein preprocessing the first signal comprises determining a spectrum of the first signal;
sending the preprocessed first signal and spectrum information about the preprocessed first signal to a server for diagnosing the robot, wherein the spectrum information comprises a frequency amplitude of a sub-component of the rotating component, wherein the frequency amplitude is determined from the spectrum of a resampled first signal based on physical characteristics of the sub-component and a speed of the sub-component, wherein the physical characteristics comprise one or more dimensional parameters of the sub-component; and
receiving a second signal from the server, the second signal comprising diagnostic information which indicates a failure of a sub-component of the rotating component.

16. The device of claim 15, wherein preprocessing the first signal comprises:
segmenting the first signal in a time domain into a plurality of parts; and
selecting at least one of the plurality of parts to send to the server.

17. The device of claim 15, wherein preprocessing the first signal comprises:
resampling the first signal with a sampling rate based on a speed of the rotating component; and
segmenting the resampled first signal into a plurality of parts; and
selecting at least one of the plurality of parts to send to the server.

18. The device of claim 15, wherein preprocessing the first signal comprises:
segmenting the spectrum into a plurality of parts; and
selecting at least one of the plurality of parts to send to the server.

19. The device of claim 15, wherein preprocessing the first signal comprises:
determining the spectrum information from the spectrum, the spectrum information at least comprising the frequency amplitude of the sub-component of the rotating component based on the physical characteristics of the sub-component and the speed of the sub-component.

20. The device of claim 15, wherein the motion information indicates at least one of the following:
a rotational speed of the rotating component;
a control current of the rotating component;
a torque of the rotating component; or
an acceleration of the rotating component.

21. The device of claim 15, wherein the sub-component comprises at least one of the following:
a gear of a gearbox;
a shaft of a motor; or
a bearing of a motor or a gearbox.

22. A server, comprising:
a controller;
a memory coupled to the controller and storing machine-executable instructions which, when executed by the controller, cause the server to perform acts comprising:
receiving a first signal or spectrum information about the first signal from a robot, the first signal at least comprising motion information of a rotating component;
obtaining a frequency amplitude of a sub-component of the rotating component based on the received first signal or the received spectrum information, wherein the frequency amplitude is determined from a spectrum of a resampled first signal based on physical characteristics of the sub-component, wherein the physical characteristics comprise one or more dimensional parameters of the sub-component;
detecting a failure of the sub-component by comparing the frequency amplitude with a threshold amplitude; and
sending a second signal to the robot, the second signal comprising diagnostic information indicating whether the sub-component of the rotating component has a failure.

23. The server of claim 22, wherein detecting the failure comprises:
in response to the frequency amplitude exceeding the threshold amplitude, detect that the sub-component has the failure.

24. The server of claim 22, wherein obtaining the frequency amplitude comprises:
resampling the received first signal with a sampling rate based on a speed of the rotating component; and
determining the frequency amplitude from the spectrum of the resampled first signal based on the physical characteristics of the sub-component and a speed of the sub-component.

25. The server of claim 24, wherein the physical characteristic comprises one or more structural parameters of the sub-component.

26. The server of claim 22, wherein obtaining the frequency amplitude comprises:
determining the frequency amplitude from the received spectrum information based on the physical characteristics of the sub-component and a speed of the sub-component.

27. The server of claim 22, wherein the threshold amplitude is empirically predetermined.

28. The server of claim 22, wherein the threshold amplitude is determined by machine self-learning.

* * * * *